United States Patent

Tretter

[11] 3,998,472
[45] Dec. 21, 1976

[54] HITCH PIN DEVICE

[75] Inventor: Ted A. Tretter, Fort Ripley, Minn.

[73] Assignee: The Raymand Lee Organization, Inc., New York, N.Y.; a part interest

[22] Filed: Dec. 11, 1975

[21] Appl. No.: 639,632

[52] U.S. Cl. .......................................... 280/515
[51] Int. Cl.² ........................................ B60D 1/02
[58] Field of Search .......... 280/515, 507, 506, 514, 280/457

[56] References Cited

UNITED STATES PATENTS

| 2,522,215 | 9/1950 | DuShane | 280/515 |
|---|---|---|---|
| 2,654,613 | 10/1953 | Blair et al. | 280/515 |
| 2,697,618 | 12/1954 | Hulstedt | 280/515 |
| 3,326,575 | 6/1967 | Shepley | 280/515 |
| 3,794,357 | 2/1974 | Frye | 280/515 |
| 3,825,284 | 7/1974 | Behrle | 280/515 |

Primary Examiner—Robert R. Song
Assistant Examiner—Michael J. Forman
Attorney, Agent, or Firm—Daniel Jay Tick

[57] ABSTRACT

A pair of spaced parallel plates are affixed to and extend from a vehicle. The plates have bores formed therethrough in perpendicular alignment. A pin latch is affixed at one end thereof to the upper one of the plates in a manner whereby the pin latch extends parallel to and spaced from the one of the plates and is free from the one of the plates along its entire length except for the one end thereof. A pin device comprises a bar-like pin bar having first and second spaced opposite ends and a pin is affixed to the first end of the pin bar and removably extends from the one of the plates through the bores of both the plates in a manner whereby a ring coupled to another vehicle and positioned around the pin is secured on the pin by and between the plates. A spiral spring has first and second spaced opposite ends and is affixed at its first end to the second end of the pin bar. The spring is affixed at its second end to the one of the plates at a point spaced from the second end of the pin bar on the opposite side of the pin latch from the bores. The spring applies a force to the pin bar maintaining the pin bar between the pin latch and one of the plates about the pin as a pivot whereby the pin is removable from the bores upon the application of manual force against the force of the spring to move the second end of the pin bar so that the pin bar is moved about the pin as a pivot out of the pin latch thereby permitting the pin bar to be raised above the one of the plates to remove the pin from the bores.

2 Claims, 3 Drawing Figures

HITCH PIN DEVICE

BACKGROUND OF THE INVENTION

The present invention relates to a hitch pin device. More particularly, the invention relates to a hitch pin device for releasably coupling one vehicle to another and, more particularly for releasably coupling a farm wagon to a tractor.

Objects of the invention are to provide a hitch pin device of simple structure, which is inexpensive in manufacture, installable with facility and convenience on any vehicle, new or in use, used with safety and great ease and facility by anyone with or without skill, and functions efficiently, effectively and reliably to releasably couple one vehicle to another with complete security and safety.

BRIEF DESCRIPTION OF THE DRAWINGS

In order that the invention may be readily carried into effect, it will now be described with reference to the accompanying drawing, wherein.

DETAILED DESCRIPTION OF THE INVENTION

Figure 1:
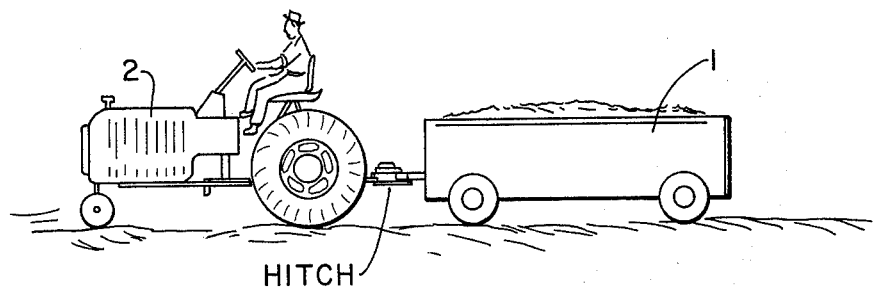
FIG. 1 is a view of the hitch pin device of the invention in use.

The hitch pin device of the invention releasably couples one vehicle 1, such as, for example, a farm wagon, implement, or any type of towed vehicle, to another vehicle 2, such as, for example, farm tractor, tractor, or any type of towing vehicle (FIG. 1).

The hitch pin device of the invention comprises a pair of spaced substantially parallel plates 3 and 4 (FIG. 2) affixed to, and extending from, the vehicle 1, one above the other. The plates 3 and 4 have bores 5 and 6, respectively, formed therethrough in substantially perpendicular alignment (FIG. 2).

A pin latch 7 (FIGS. 2 and 3) is affixed at one end 8 thereof to the upper one of the plates 3 in a manner whereby the pin latch extends substantially parallel to and spaced from said plate and is free from said plate along its entire length except for the one end 8 thereof.

Figure 2:
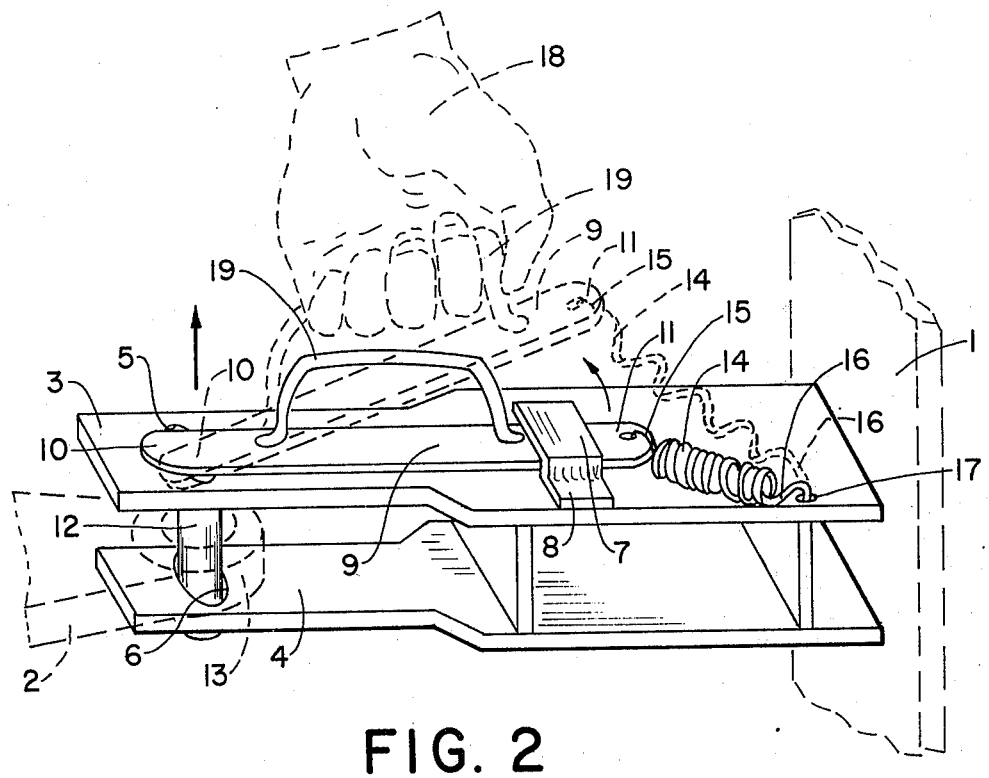
FIG. 2 is a perspective view, on an enlarged scale, of an embodiment of the hitch pin device of the invention.
Figure 3:
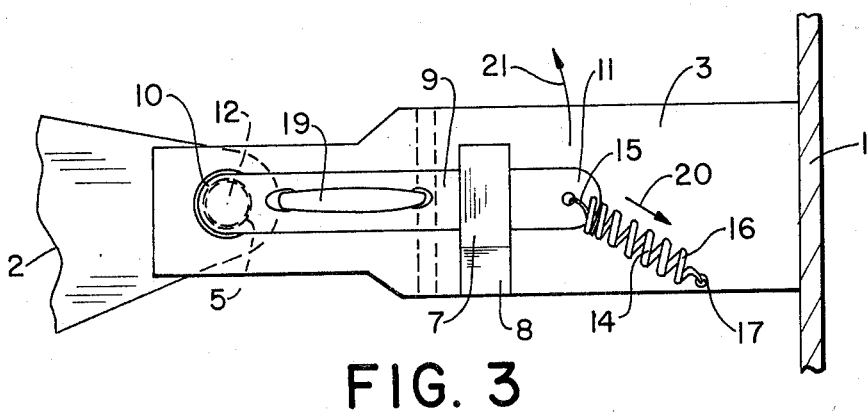
FIG. 3 is a top view, on a reduced scale, of the embodiment of FIG. 2.

A pin device comprises a substantially bar-like pin bar 9 (FIGS. 2 and 3) having first and second spaced opposite ends 10 and 11 (FIGS. 2 and 3). A pin 12 (FIGS. 2 and 3) is affixed to the first end 10 of the pin bar 9 and removably extends from the plate 3 through the bores 5 and 6 of both plates 3 and 4 in a manner whereby a ring 13 (FIG. 2) coupled to the other vehicle 2 (FIGS. 2 and 3), and positioned around said pin, is secured on said pin and between said plates, as shown in FIG. 2.

A spiral spring 14 (FIGS. 2 and 3) has first and second spaced opposite ends 15 and 16. The spring 14 is affixed at its first end 15 to the second end 11 of the pin bar 9 and is affixed at its second end 16 to the plate 3 at a point 17 (FIGS. 2 and 3) spaced from said second end of said pin bar on the opposite side of the pin latch 7 from the bores 5 and 6. The spring 14 applies a force to the pin bar 9 maintaining said pin bar between the pin latch 7 and the plate 3 about a pin 12 as a pivot.

Thus, the pin 12 is removable from the bores 5 and 6 upon the application of manual force, represented by a hand 18 in FIG. 2, against the force of the spring 14 to move the second end 11 of the pin bar so that said pin bar is moved about said pin 12 as a pivot out of the pin latch 7 thereby permitting said pin bar to be raised above the plate 3 to remove said pin from said bores, as shown by broken lines in FIG. 2.

A handle 19 is affixed to, and extends above, the pin bar 9 for facilitating manual gripping and movement of said pin bar. Thus, in the position shown by solid lines in FIGS. 2 and 3, the vehicles 1 and 2 are securely coupled to each other, since the pin 12 is secured in position between the plates 3 and 4 by the pin latch 7 which holds the pin bar 9 in substantial juxtaposition with the upper surface of the plate 3. This is due to the action of the spring 14 which applies a force in the direction of an arrow 20 in FIG. 3. When the coupling is to be released, the handle 19 is gripped in the manner shown by broken lines in FIG. 2, and the pin bar 9 is pivotally moved about the pin 12 in a counterclockwise direction, indicated by an arrow 21 in FIG. 3, against the action and force of the spring 14 until the end 11 and the entire end area thereof is free from said pin latch. The pin bar 9 which is then free from pin latch 7, is raised so that the pin 12 is removed from the bores 5 and 6 of the plates 3 and 4 and the ring 13 is readily released from between said plates.

While the invention has been described by means of a specific example and in a specific embodiment, I do not wish to be limited thereto, for obvious modifications will occur to those skilled in the art without departing from the spirit and scope of the invention.

I claim:

1. A hitch pin device for releasably coupling one vehicle to another, said hitch pin device comprising
   a pair of spaced substantially parallel plates affixed to and extending from a vehicle one above the other, said plates having bores formed therethrough in substantially perpendicular alignment;
   a pin latch affixed at one end thereof to the upper one of the plates in a manner whereby the pin latch extends substantially parallel to and spaced from said one of said plates and is free from said one of said plates along its entire length except for the one end thereof;
   a pin device comprising a substantially bar-like pin bar having first and second spaced opposite ends and a pin affixed to the first end of the pin bar and removably extending from the one of the plates through the bores of both said plates in a manner whereby a ring coupled to another vehicle and positioned around the pin is secured on said pin by and between said plates; and
   spiral spring means having first and second spaced opposite ends, affixed at its first end to the second end of the pin bar and affixed at its second end to the said one of said plates at a point spaced from the second end of the pin bar on the opposite side of the pin latch from the bores, said spring means applying a force to said pin bar maintaining said pin bar between the pin latch and said one of said plates about said pin as a pivot whereby said pin is removable from said bores upon the application of manual force against the force of the spring to move the second end of the pin bar so that the pin bar is moved about the pin as a pivot out of the pin latch thereby permitting the pin bar to be raised above said one of said plates to remove the pin from said bores.

2. A hitch pin device as claimed in claim 1, further comprising a handle affixed to and extending above the pin bar for facilitating manual gripping and movement thereof.

* * * * *